(12) United States Patent
Choi (10) Patent No.: US 11,677,880 B2
(45) Date of Patent: Jun. 13, 2023

(54) SWITCHBOARD MANAGEMENT SYSTEM

(71) Applicant: LS ELECTRIC CO., LTD., Anyang-si (KR)

(72) Inventor: Ji-Hyun Choi, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 270 days.

(21) Appl. No.: 16/971,928

(22) PCT Filed: Jan. 10, 2019

(86) PCT No.: PCT/KR2019/000412
§ 371 (c)(1),
(2) Date: Aug. 21, 2020

(87) PCT Pub. No.: WO2019/177251
PCT Pub. Date: Sep. 19, 2019

(65) Prior Publication Data
US 2021/0021713 A1    Jan. 21, 2021

(30) Foreign Application Priority Data
Mar. 14, 2018    (KR) .................. 10-2018-0029941

(51) Int. Cl.
*H04M 7/00*    (2006.01)
*H04M 3/42*    (2006.01)
(Continued)

(52) U.S. Cl.
CPC ...... *H04M 7/0093* (2013.01); *G05B 23/0283* (2013.01); *H02J 7/0047* (2013.01);
(Continued)

(58) Field of Classification Search
CPC ............. H04M 7/0093; H04M 3/4228; H04M 3/42314; G05B 23/0283;
(Continued)

(56) References Cited

U.S. PATENT DOCUMENTS 8,649,987 B2 *   2/2014   Steenberg .......... G05B 23/0235
                                                    707/769
10,732,223 B2 *  8/2020   Donolo .............. G01R 31/3277
(Continued)

FOREIGN PATENT DOCUMENTS

EP       2448087 A1    5/2012
JP     2000222993 A    8/2000
(Continued)

OTHER PUBLICATIONS

Extended European Search Report for related European Application No. 19767919.4; report dated Mar. 12, 2021; (8 pages).
(Continued)

*Primary Examiner* — Mohammad K Islam
(74) *Attorney, Agent, or Firm* — K&L Gates LLP (57) ABSTRACT

A switchboard management system according to an embodiment of the present disclosure comprises: at least one gateway connected to at least one from among a plurality of circuit breakers in a switchboard panel; and a server connected to the at least one gateway, wherein the at least one gateway comprises an environment sensing unit for acquiring environment data on the at least one circuit breaker connected thereto, and the server receives, from the at least one gateway, driving information on the plurality of circuit breakers and the environment data and predicts the remaining lifespan of each of the plurality of circuit breakers on the basis of the received driving information and environment data.

11 Claims, 7 Drawing Sheets

(51) Int. Cl.
*G05B 23/02* (2006.01)
*H02J 7/00* (2006.01)
*H04L 65/40* (2022.01)
*H05B 47/28* (2020.01)

(52) U.S. Cl.
CPC .......... *H04L 65/40* (2013.01); *H04M 3/4228* (2013.01); *H04M 3/42314* (2013.01); *G05B 2219/37337* (2013.01); *H05B 47/28* (2020.01)

(58) Field of Classification Search
CPC .......... G05B 2219/37337; H02J 7/0047; H02J 13/00036; H02J 13/00006; H02J 13/00002; H04L 65/40; H04L 12/66; H04L 67/12; H05B 47/28; H02B 13/065; Y02B 90/20; Y02E 60/00; Y04S 40/12; Y04S 10/30; G06Q 50/10
See application file for complete search history.

(56) References Cited

U.S. PATENT DOCUMENTS

| | | | | |
|---|---|---|---|---|
| 2010/0254060 | A1* | 10/2010 | Saito | H01H 9/56 |
| | | | | 361/115 |
| 2012/0306656 | A1* | 12/2012 | Boucher | H01H 33/563 |
| | | | | 324/424 |
| 2016/0225562 | A1* | 8/2016 | Franks | H02H 3/08 |
| 2017/0045481 | A1* | 2/2017 | Benke | G01N 29/46 |
| 2017/0184675 | A1* | 6/2017 | Freer | G01R 31/3277 |
| 2017/0373536 | A1* | 12/2017 | Al Hajjaj | G05B 19/042 |

FOREIGN PATENT DOCUMENTS

| | | |
|---|---|---|
| JP | 2004192252 A | 7/2004 |
| JP | 2004288503 A | 10/2004 |
| KR | 101336317 B1 | 12/2013 |
| KR | 101465401 B1 | 12/2014 |
| KR | 101550585 B1 | 9/2015 |
| KR | 101694708 B1 | 1/2017 |

OTHER PUBLICATIONS

International Search Report for related International No. PCT/KR2019/000412; action dated Sep. 19, 2019; (5 pages).

Written Opinion for related International No. PCT/KR2019/000412; action dated Sep. 19, 2019; (4 pages).

* cited by examiner

SWITCHBOARD MANAGEMENT SYSTEM

CROSS-REFERENCE TO RELATED APPLICATIONS

The present application is a National Stage of International Application No. PCT/KR2019/000412, filed on Jan. 10, 2019, which claims the benefit of earlier filing date and right of priority to Korean Application No. 10-2018-0029941 filed on Mar. 14, 2018, the contents of which are all hereby incorporated by reference herein in their entirety.

FIELD

The present disclosure relates to a switchboard management system, and specifically to a switchboard management system capable of predicting a lifespan of a device such as a circuit breaker disposed in a switchboard panel.

DESCRIPTION OF RELATED ART BACKGROUND

A switchboard refers to a facility installed in a building, etc., and including a switch, a circuit breaker, a meter, etc. to control a power distribution system and perform electricity distribution, switching, safety, and metering. The switchboard may include a plurality of switchboard panels depending on a size of an installation location (building, etc.) or an amount of a load, etc. Each switchboard panel may include the switch, the circuit breaker, and the meter.

The switchboard panels may be installed in various positions in the building in a distributed manner and supply power to loads existing therearound.

The device such as the circuit breaker disposed in the switchboard panel has a limited lifespan. Thus, replacement thereof may be required as the lifespan ends. However, the same type of devices may have different lifespans depending on a surrounding environment condition such as a temperature or a humidity, and operation information such as on/off times.

As the lifespan difference between the devices occurs, it is difficult for an operator to predict when to replace the devices. As a result, inconvenience imposed to the operator may increase. Further, a specific device should be displaced unexpectedly. However, when rapid replacement of the specific device is not possible, the switchboard does not start normally, such that power devices may not work properly.

BRIEF SUMMARY

A purpose of the present disclosure is to provide a switchboard management system that may predict a lifespan or risk of abnormality of a device such as a circuit breaker placed in a switchboard panel.

In one aspect of the present disclosure, there is provided a switchboard management system comprising: at least one gateway connected to at least one circuit breaker among a plurality of circuit breakers disposed in a switchboard panel; and a server connected to the at least one gateway, wherein the at least one gateway includes an environment sensing unit to acquire environment data about an environment around the at least one circuit breaker, wherein the server is configured to: receive operation information of the plurality of the circuit breakers and the environment data from the at least one gateway; and predict a residual lifespan of each of the plurality of the circuit breakers, based on the received operation information and environment data.

The environment sensing unit may include: a temperature sensor to acquire temperature data among the environment data; and a humidity sensor to acquire humidity data among the environment data.

The environment sensing unit may further include at least one of: a noise sensor to acquire noise data among the environment data; or a vibration sensor to acquire vibration data among the environment data.

The operation information may include information on a number of on/off times of a corresponding circuit breaker.

The server may be configured to group the plurality of the circuit breakers into environment-based groups, based on the environment data received from the at least one gateway; and predict a residual lifespan of each of the plurality of the circuit breakers, based on an environment-based group including each of the plurality of the circuit breakers, and the operation information of each of the plurality of the circuit breakers.

The server may be configured to predict the residual lifespan of each of the plurality of the circuit breakers based on reference data set for the environment-based group including each of the plurality of the circuit breakers, wherein the reference data includes data on change in a residual lifespan of each of the plurality of the circuit breakers based on the number of on/off times thereof.

The server may be configured to extract at least one circuit breaker whose a predicted residual lifespan is lower than a threshold, from the plurality of the circuit breakers; and to create a notification or a message indicating that the extracted circuit breaker should be about to be replaced.

The server may be configured to output the created notification or message on an output device connected to the server, or to transmit the created notification or message to a terminal connected to the server.

The server may be configured to transmit the created notification or message to a gateway connected to the extracted circuit breaker.

In one embodiment, a first gateway among the at least one gateway may be configured to detect abnormality of a first circuit breaker connected to the first gateway among the at least one circuit breaker, and transmit information about the detected first circuit breaker to the server, wherein the server may be configured to acquire operation information of the first circuit breaker from database or a memory; and identify at least one second circuit breaker among the plurality of the circuit breakers as an abnormality-probable circuit breaker, wherein the at least one second circuit breaker has operation information whose a similarity to the operation information of the first circuit breaker is higher than a reference value.

In one embodiment, each of the at least one gateway may be adjacent to the at least one circuit breaker connected thereto.

Technical Effects

According to various embodiments of the present disclosure, the switchboard management system may predict the lifespan of the device based on the environment information obtained using the gateway having the environment sensing unit such as the temperature sensor or the humidity sensor and the operation information of the device in a switchboard panel. Accordingly, the switchboard management system may enable the operator to more effectively manage the device disposed in the switchboard panel.

Further, the switchboard management system detects impending replacement of the device based on the lifespan prediction of the device and notifies the operator of the impending replacement thereof, so that the operator may prepare for replacement thereof. Accordingly, when the switchboard is inoperable due to failure resulting from exhausted lifespan of the device, the operator may rapidly cope with this situation to effectively reduce a time duration for which the switchboard is operable.

In addition, when abnormality occurs in a specific device, the switchboard management system may identify a device having an environment condition or operation information similar to that of the device having the abnormality and may report risk of abnormality of the identified device to the operator. Thus, as the operator or the user may check or examine the identified device in response to the risk of the abnormality, management efficiency of the device may be increased.

DETAILED DESCRIPTION

Hereinafter, exemplary embodiments disclosed in the present disclosure will be illustrated in detail with reference to the accompanying drawings. The same or similar elements will be assigned the same reference numbers throughout the accompanying drawings. Overlapping descriptions between the exemplary embodiments will be omitted. As used herein, a suffix "module" or "unit" as used for a component are intended only for ease of writing the present disclosure, and the suffix "module" or "unit" itself does not have a specific meaning or role. Further, in describing the embodiments disclosed in the present disclosure, detailed descriptions of well-known components are omitted when it is determined that the detailed descriptions of the well-known components obscure gist of the embodiments disclosed in the present disclosure. Further, it should be understood that the attached drawings are set forth only for easy understanding of the embodiments disclosed in the present disclosure, and a technical spirit disclosed in the present disclosure is not limited to the attached drawings, and all changes, equivalents, or substitutes to or with the embodiments disclosed in the present disclosure are included in the scope of the present disclosure.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

As used herein, the singular forms "a" and "an" are intended to include the plural forms as well, unless the context clearly indicates otherwise.

It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

Hereinafter, exemplary embodiments of the present disclosure will be described in detail with reference to the accompanying drawings in the present disclosure.

Figure 1:
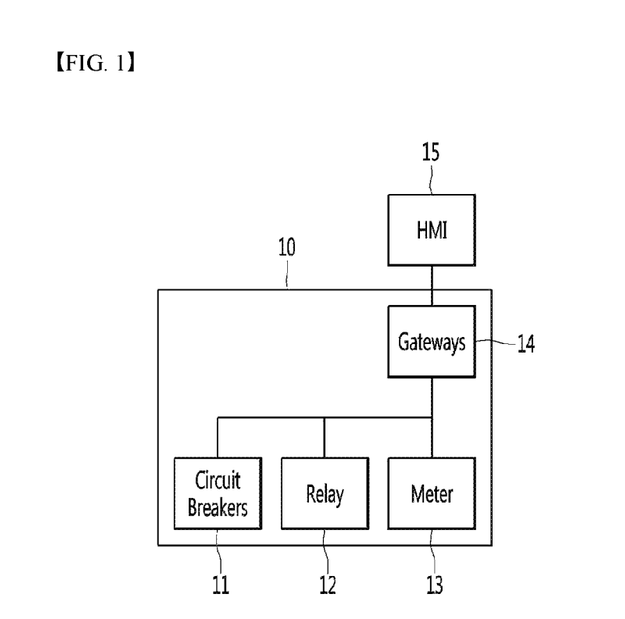
FIG. 1 is a schematic block diagram showing an example of a switchboard panel.
Figure 2:
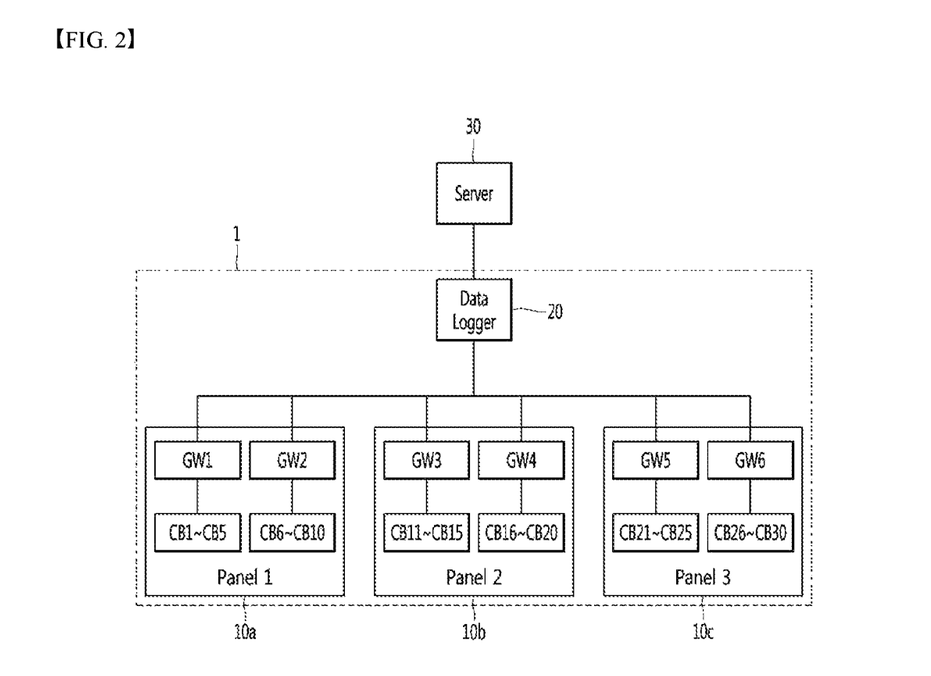
FIG. 2 is a schematic block diagram of a switchboard management system according to an embodiment of the present disclosure.

FIG. 1 is a schematic block diagram showing an example of a switchboard panel. FIG. 2 is a schematic block diagram of a switchboard management system according to an embodiment of the present disclosure.

Referring to FIG. 1, a switchboard panel 10 may include a plurality of circuit breakers 11, a relay 12, a meter 13, and at least one gateway 14. The switchboard panel 10 is not composed only of the components shown in FIG. 1. According to another embodiment, the switchboard management system may include the number of components larger or smaller than the number thereof as shown in FIG. 1.

The plurality of circuit breakers 11 may be disposed inside the switchboard panel 10. The number of the circuit breakers placed inside the switchboard panel 10 may be determined based on the number of lines branching inside the switchboard panel 10. For example, each of the circuit breakers 11 may be fixedly installed into a slot or the like inside the switchboard panel 10.

when factors such as overcurrent, overvoltage, undervoltage, short circuit, and ground fault are detected on each line, each of the circuit breakers 11 may break each line to protect the switchboard and a load or various systems connected thereto. The circuit breakers 11 may have 1:1 correspondence to the lines, so that a breaking operation of each corresponding line may be performed by each corresponding circuit breaker (CB). Each of the circuit breakers 11 may be implemented as an air circuit breaker (ACB), a molded case circuit breaker (MCCB), or a molded circuit breaker (MCB). Generally, ACB with the highest allowable current may be placed on an higher level line, and MCB with the lowest allowable current may be placed on a lower level line.

Each of the circuit breakers 11 is disposed on each of the branched lines in the switchboard panel 10. Thus, an ancestry relationship between the lines may correspond to an ancestry relationship between the circuit breakers 11.

Each of the circuit breakers 11 may include a switch (not shown). When the switch of each of the circuit breakers 11 is turned off, a corresponding line may be cut off and power supply may be stopped. When the switch of each of the circuit breakers 11 is turned on, the power supply may be resumed. For example, each of the circuit breakers 11 may turn each switch on/off based on a control signal received from the gateway 14. According to another embodiment, the switch may be turned on/off by an operator or a user manually manipulating the switch. The switch may be embodied in a form of a physical switch which may be displaced when the switch is turned on/off and vibration may occur at a specific level.

A lifespan of each of the circuit breakers 11 gradually decreases over time or due to the number of on/offs, etc. As the lifespan of the circuit breaker (CB) runs out, replacement of the circuit breaker is required. When the number of on/offs of each of the circuit breakers 11 becomes a specific number, the lifespan thereof may be exhausted. However, the specific number of times may be changed based on an environment condition (temperature, humidity, etc.) around the circuit breaker.

The relay 12 may be controlled to supply or cut off power to a load such as a motor. When an accident current such as overcurrent or short circuit current occurs in the load, the relay 12 may protect the load. The relay 12 may be implemented as an electronic motor protection relay (EMPR), but is not limited thereto.

The meter 13 may measure and monitor a power amount of a power system of the switchboard. For example, the meter 13 may be implemented as a digital integrated meter (GIMAC), but is not limited thereto.

The at least one gateway 14 may be disposed inside the switchboard panel 10. According to another embodiment, the at least one gateway 14 may be disposed outside the switchboard panel 10.

The at least one gateway 14 may be connected to the circuit breakers 11, the relay 12, and the meter 13 in the switchboard panel 10 via wired or wireless communication (for example, RS485) and may receive various information related to an operating state of the switchboard from the circuit breakers 11, the relay 12, and the meter 13, respectively. Each of the circuit breakers 11, the relay 12, and the meter 13 may be connected to one of the at least one gateway 14 in the switchboard panel 10.

The at least one gateway 14 may transmit the received information to a data logger 20 in FIG. 2 or a server 30 in FIG. 2. Further, the at least one gateway 14 may receive a control command related to a component connected thereto among the components inside the switchboard panel 10 from the data logger 20 or the server 30. Further, the at least one gateway 14 may control the components 11, 12, and 13 based on the received control command, or may create the control command directly to control the components 11, 12, and 13.

According to an embodiment, the at least one gateway 14 may be connected to a human machine interface (HMI) 15. The HMI 15 may be disposed on an outer face of the switchboard panel 10 or may be external to the switchboard panel 10. The HMI 15 may receive various information related to an operating state of each of the components in the switchboard panel 10 from the at least one gateway 14 and display the information in graphic or text form. Further, the HMI 15 may receive various commands or requests related to an operation of the switchboard from the operator or the user, and may send the received commands or requests to the gateway 14. The gateway 14 may process the commands or requests received from the HMI 15 and may output the processing result on the HMI 15.

In particular, the at least one gateway 14 according to an embodiment of the present disclosure may include various sensors for sensing an environment in the switchboard panel 10. This will be described in more detail later in FIG. 3.

Referring to FIG. 2, the switchboard panel 10 may include a plurality of switchboard panels 10a to 10c in a specific site 1. The number of switchboard panels installed in the site 1 may vary depending on a size of the site 1 or an amount of the load.

The switchboard management system according to an embodiment of the present disclosure may include at least one of the plurality of switchboard panels 10a to 10c, the data logger 20, and the server 30.

The data logger 20 may be connected to gateways GW1 to GW6 disposed in the at least one of the plurality of switchboard panels 10a to 10c and the server 30 via wired or wireless communication. The data logger 20 may receive various information related to operations of the gateways GW1 to GW6 and lower level devices (the circuit breakers 11, the relay 12, the meter 13, etc.) and may send the received information to the server 30. Further, the data logger 20 may transmit a control command received from the server 30 to corresponding gateways GW1 to GW6.

The server 30 may be implemented in a form of a cloud server to manage information about operations of the components in switchboard panel 10 in an integrated manner.

In particular, the server 30 according to an embodiment of the present disclosure may acquire environment data (temperature, humidity, noise, etc.) from each of the gateways GW1 to GW6 and may create environment information based on the acquired environment data, and may group the circuit breakers CB1 to CB30 into a plurality of environment-based groups, based on the created environment information. For example, the server 30 may configure an environment-based group of a first circuit breaker CB1 to a fifth circuit breaker CB5 connected to a first gateway GW1 based on the environment information about the first gateway GW1.

That is, environment information corresponding to a specific gateway may correspond to environment information about a circuit breaker connected to the specific gateway. In this case, the specific gateway may be placed in a position adjacent to a circuit breaker connected thereto within the switchboard panel 10. For example, in the first switchboard panel 10a, the first gateway GW1 may be disposed at a position adjacent to the first circuit breaker CB1 to the fifth circuit breaker CB5, and a second gateway GW2 may be disposed at a position adjacent to a sixth circuit breaker CB6 to a tenth circuit breaker CB10.

The server 30 may predict a lifespan or a risk of abnormality of each of the circuit breakers CB1 to CB30 based on operation information of each of the circuit breakers CB1 to CB30 and the environment information. Herein, an example in which the lifespan or the risk of abnormality of the circuit breakers CB1 to CB30 among devices included in the plurality of switchboard panels 10a to 10c is predicted will be described. However, embodiments of the disclosure may be similarly applied to the circuit breakers as well as other devices 12 and 13 included in the plurality of switchboard panels 10a to 10c.

In one example, as shown in FIG. 2, the plurality of switchboard panels 10a to 10c and the data logger 20 may be disposed in the site 1. The server 30 may not be disposed in the site 1. However, depending on embodiments, the server 30 may be disposed in the site 1.

Figure 3:
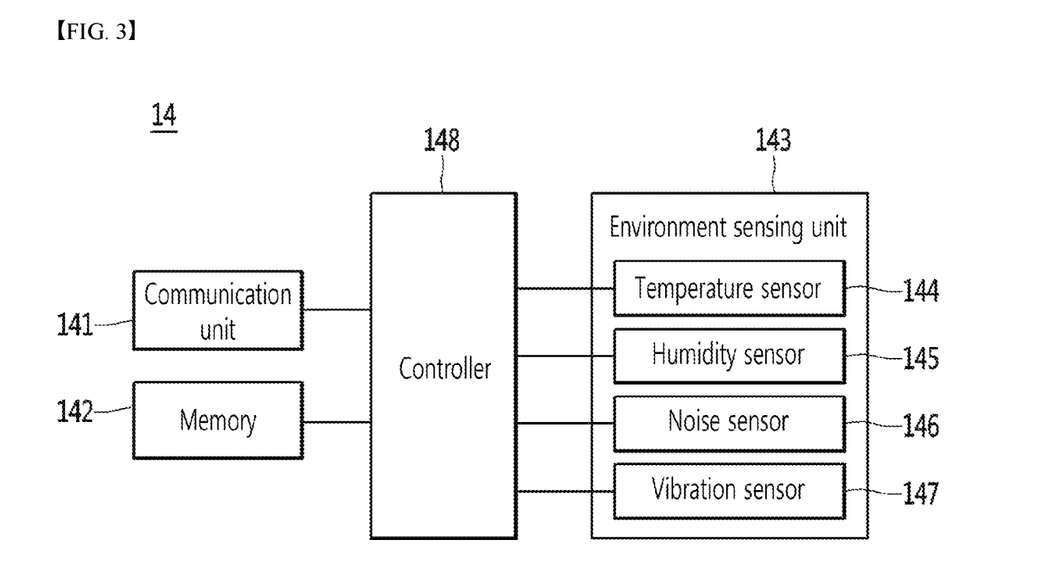
FIG. 3 is a schematic block diagram of a gateway included in a switchboard panel according to an embodiment of the present disclosure.

FIG. 3 is a schematic block diagram of a gateway included in a switchboard panel according to an embodiment of the present disclosure.

Referring to FIG. 3, a gateway 14 may include a communication unit 141, a memory 142, an environment sensing unit 143, and a controller 148.

The communication unit 141 may include at least one wired/wireless communication module that enables communications between the gateway 14 and the circuit breakers 11, between the gateway 14 and the relay 12, between the gateway 14 and the meter 13, between the gateway 14 and the data logger 20, between the gateway 14 and the HMI 15, and/or between the gateway 14 and a terminal (not shown).

The memory 142 may store therein various information or data related to an operation of the gateway 14, and information on the components 11, 12, and 13 included in the switchboard panel 10.

The environment sensing unit 143 may acquire environment data about an environment around the gateway 14. For example, the environment sensing unit 143 may include a temperature sensor 144, a humidity sensor 145, a noise sensor 146, and a vibration sensor 147. However, the components included in the environment sensing unit 143 are not limited thereto. When the environment sensing unit 143 includes the sensors shown in FIG. 3, the environment data may include at least one of a temperature, a humidity, a noise, and a vibration.

The controller 148 may control an overall operation of the gateway 14. In particular, the controller 148 according to an embodiment of the present disclosure may control the sensors 144 to 147 included in the environment sensing unit 143 to obtain the environment data about the environment around the gateway 14, and may transmit the acquired environment data to the server 30 via the data logger 20.

According to an embodiment, the controller 148 may receive information about an impending replacement target circuit breaker or an abnormality-probable circuit breaker from the server 30. The controller 148 may provide the received information to the terminal or display the same on the HMI 15.

Hereinafter, an operation in which the switchboard management system predicts a lifespan of a device (e.g., the circuit breaker) in the switchboard panel 10 will be described with reference to FIG. 4 to FIG. 6.

Figure 4:
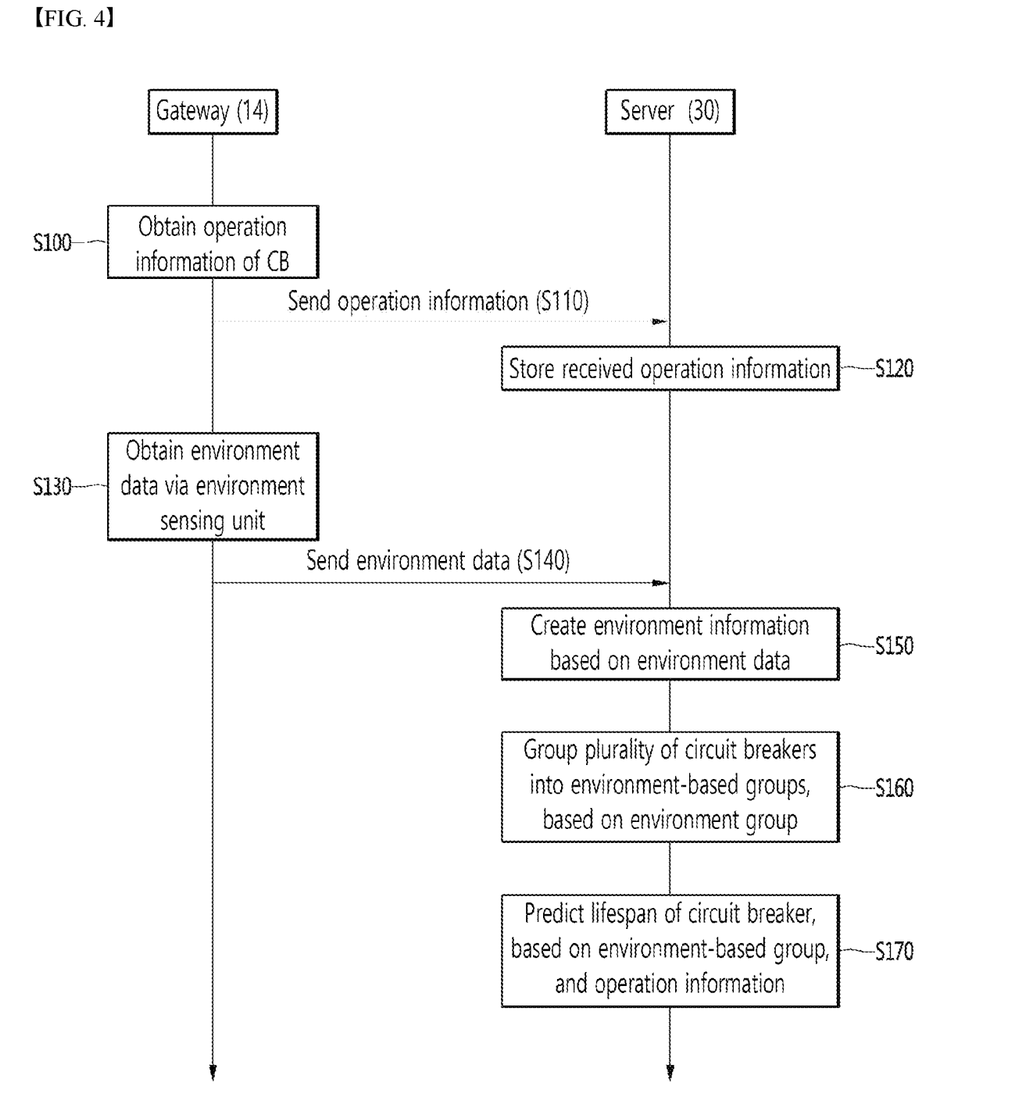
FIG. 4 is a flowchart for describing an operation method of a switchboard management system according to an embodiment of the present disclosure.

FIG. 4 is a flowchart for describing a method for operating a switchboard management system according to an embodiment of the present disclosure. FIG. 5 is an exemplary view showing an operation in which a server according to an embodiment of the present disclosure groups the circuit breakers into environment-based groups based on environment information. FIG. 6 is an example diagram showing change in a lifespan based on the number of on/off times of a circuit breaker in each environment-based group.

In following drawings, it may be assumed that operation information of the circuit breaker 11 may include the number of on/off times, and the environment data obtained by the environment sensing unit 143 may include temperature data and humidity data. However, the operation information and the environment data are not limited thereto.

Referring to FIG. 4, the gateway 14 may obtain operation information of the circuit breakers 11 (S100), and may transmit the obtained operation information to the server 30 via the data logger 20 (S110).

The gateway 14 may acquire the operation information of each of at least one circuit breaker connected to the gateway 14 among the circuit breakers 11 disposed in the switchboard panel 10. Referring to the embodiment shown in FIG. 2, the first gateway GW1 may obtain operation information of each of the first circuit breaker CB1 to the fifth circuit breaker CB5 connected to the first gateway GW1, among the circuit breakers CB1 to CB10 disposed in the first switchboard panel 10a. The first gateway GW1 may transmit the obtained operation information to the server 30 through the data logger 20.

For example, the operation information may include the number of on/off times of the circuit breaker. Depending on an implementation, the operation information may further include information on an installation date of the circuit breaker or information on a load (a current amount, etc.) of a line on which the circuit breaker is disposed.

The server 30 may store therein the received operation information (S120). For example, the server 30 may store the operation information of each of the circuit breakers CB1 to CB30 as received from the first gateway GW1 to the sixth gateway GW6 into a memory (not shown) of the server 30 or database connected to the server 30.

The gateway 14 may acquire the environment data about the environment around the gateway 14 via the environment sensing unit 143 (S130), and may transmit the obtained environment data to the server 30 (S140).

For example, the gateway 14 may periodically or continuously acquire the environment data about the environment around the gateway 14. As described above in FIG. 3, the environment data may include at least one of temperature, humidity, noise, and vibration.

Further, as described above, since the gateway 14 is disposed adjacent to the circuit breaker connected thereto, the environment data about the environment around the gateway 14 may correspond to environment data about an environment around the circuit breaker connected thereto. For example, the environment data obtained by the first gateway GW1 may correspond to environment data about an environment around the first circuit breaker CB1 to the fifth circuit breaker CB5.

The server 30 may create environment information about each of the circuit breakers 11 based on the acquired environment data (S150), and may configure the environment-based groups of the circuit breakers 11 based on the created environment information (S160).

The server 30 may create environment information about each of the circuit breakers CB1 to CB30 based on the environment data received from at least one of the gateways GW1 to GW6. The environment information may be created as a combination of a plurality of data included in the environment data. For example, when the environment data includes temperature data and humidity data, the server 30 may create the environment information corresponding to one of high temperature and high humidity, high temperature and low humidity, low temperature and high humidity, and low temperature and low humidity, based on the temperature data and the humidity data.

The server 30 may group the circuit breakers CB1 to CB30 into a plurality of environment-based groups based on the created environment information. In this case, lifespans of the circuit breakers included in the same environment-based group may be predicted based on the same criteria.

Figure 5:
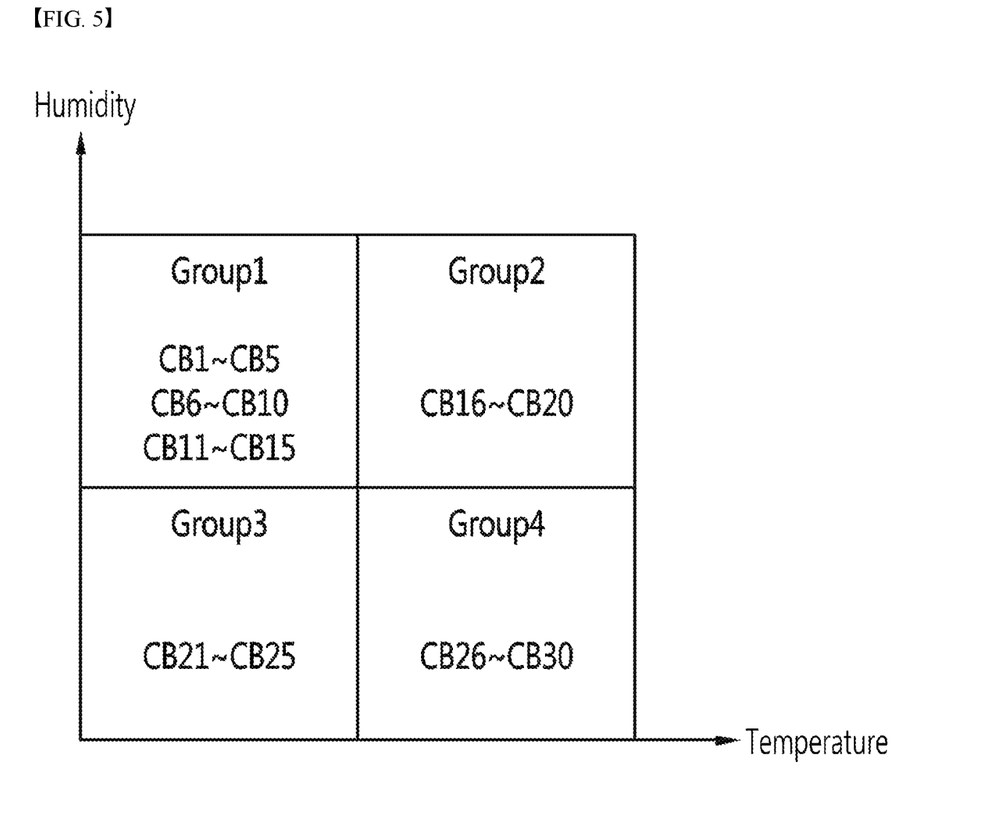
FIG. 5 is an exemplary view showing an operation in which a server according to an embodiment of the present disclosure groups circuit breakers into environment-based groups based on environment information.

In this regard, referring to an embodiment of FIG. 5, the server 30 may create the environment information based on at least one of the environment data received from each of the gateways GW1 to GW6.

For example, it is assumed that the environment information related to the first gateway GW1, the second gateway GW2, and the third gateway GW3 may correspond to 'low temperature and high humidity', and the environment information related to the fourth gateway GW4 corresponds to 'high temperature and high humidity', and the environment information related to the fifth gateway GW5 corresponds to 'low temperature low humidity', and the environment information related to the sixth gateway GW6 corresponds to 'high temperature low humidity'.

The server 30 may group the circuit breakers CB1 to CB30 into a plurality of environment-based groups based on the created environment information. According to the embodiment of FIG. 5, a first group Group1 may correspond to 'low temperature and high humidity', a second group Group2 may correspond to 'high temperature and high humidity', a third group Group3 may correspond to 'low temperature low humidity', and a fourth group Group4 may correspond to 'high temperature low humidity'. In FIG. 5, the circuit breakers CB1 to CB30 are grouped into the four environment-based groups. However, according to another embodiment, the number of the environment-based groups may be smaller or larger than 4.

In this case, the first circuit breaker CB1 to the fifteenth circuit breaker CB15 connected to one of the first gateway GW1 to the third gateway GW3 may be included in the first group Group1. The 16-th circuit breaker CB16 to the 20-th circuit breaker CB20 connected to the fourth gateway GW4 may be included in the second group Group2. The 21st circuit breaker CB21 to the 25-th circuit breaker CB25 connected to the fifth gateway GW5 may be included in the third group Group3. Finally, the 26-th circuit breaker CB26 to the 30-th circuit breaker CB30 connected to the sixth gateway GW6 may be included in the fourth group Group4.

According to an embodiment, the server 30 may change the environment-based groups of the circuit breakers CB1 to CB30 based on environment data continuously received from each of the gateways GW1 to GW6.

FIG. 4 will be described again.

The server 30 may predict the lifespan of each of the circuit breakers 11 based on the configured environment-based group and the stored operation information (S170).

The lifespan may correspond to a residual lifespan of each of the circuit breakers CB1 to CB30. For the lifespan prediction, the server 30 may have reference data for prediction of lifespans of the circuit breakers belonging to each environment-based group. For example, the reference data may mean data on a change in a lifespan based on the number of on/off times of the circuit breaker. The reference data may vary depending on the environment-based groups.

According to an embodiment, the server 30 may extract at least one circuit breaker (hereinafter, referred to as "impending replacement target circuit breaker) that is about to be replaced among the circuit breakers CB1 to CB30, based on the lifespan prediction result, and may provide information on the extracted impending replacement target circuit breaker to the operator.

The impending replacement target circuit breaker may refer to the circuit breaker whose a predicted residual lifespan is lower level than a threshold. When the impending replacement target circuit breaker is extracted from the server 30, the server may transmit information about the extracted impending replacement target circuit breaker to a terminal of the operator or output the information on an output device connected to the server 30. According to another embodiment, the server 30 may transmit information on the extracted impending replacement target circuit breaker to the gateway to which the impending replacement target circuit breaker is connected. The gateway may output information about the impending replacement target circuit breaker on the HMI 15 or transmit the information to the terminal of the operator.

Figure 6:
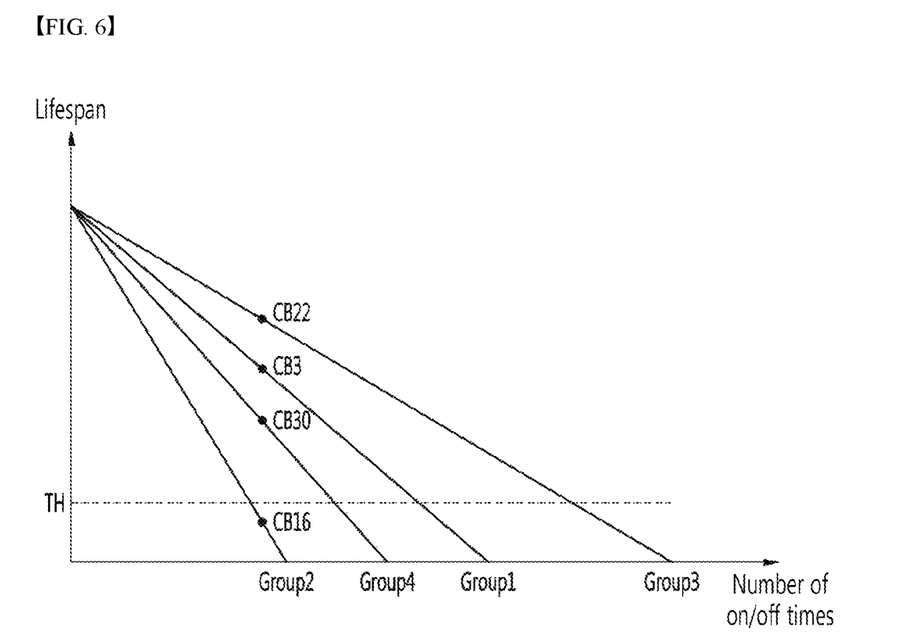
FIG. 6 is an example diagram showing change in lifespan based on the number of on/off times of a circuit breaker in each environment-based group.

In this connection, referring to FIG. 6, the server 30 may have reference data indicating change in a lifespan based on the number of on/off times of the circuit breaker in each of the environment-based groups Group1 to Group4. The reference data may be provided in a pre-created form, or may be created by accumulating lifespan change information (history) based on actual on/off frequency of the circuit breaker in each environment-based group.

As shown in a graph in FIG. 6, the reference data related to the environment-based groups (Group1 to Group4) may be different from each other. For example, a decrease in the lifespan due to an increase in the number of on/off times of the circuit breaker belonging to the second environment-based group (Group2) may be greater than that in each of other environment-based groups. A decrease in the lifespan due to an increase in the number of on/off times of the circuit breaker belonging to the third environment-based group (Group3) may be smaller than that in each of other environment-based groups.

The server 30 may extract at least one impending replacement target circuit breaker whose a residual lifespan is predicted to be lower than a threshold TH, based on the reference data and the operation information of each of the circuit breakers CB1 to CB30 (e.g., the number of on/off times).

In an embodiment of FIG. 6, the third circuit breaker CB3 belonging to the first environment-based group Group1, the sixteen circuit breaker CB16 belonging to the second environment-based group Group2, the 22-th circuit breaker CB22 belonging to the third environment-based group Group3, and the 30-th circuit breakers CB30 belonging to the fourth environment-based group Group4 may have the number of on/off times.

In this connection, the residual lifespans of the circuit breakers CB3, CB16, and CB22, CB30 may be predicted to vary depending on the environment-based groups to which the circuit breakers CB3, CB16, CB22, and CB30 belong. When the residual lifespan of the sixteenth circuit breaker CB16 is lower level than the threshold TH, the server 30 may extract the sixteenth circuit breaker CB16 as an impending replacement target circuit breaker.

The server 30 may output a notification or a message indicating that the replacement of the 16-th circuit breaker CB16 is imminent on an output device (not shown), or transmit the notification or the message to a terminal (not shown) of the operator or the user. Further, according to another embodiment, the server 30 may transmit a notification or a message indicating that the replacement of the 16-th circuit breaker CB16 is imminent to the third gateway (GW3) connected to the 16-th circuit breaker CB16. The third gateway GW3 may output the received notification or the message on the HMI 15 or the like. The notification or message may provide a list of circuit breakers that may be replaced when the 16-th circuit breaker CB16 is replaced.

Based on the notification or message, the operator or the user may perform inspection or examination of the 16-th circuit breaker CB16 or, when necessary, may replace the 160th circuit breaker CB16.

That is, according to the embodiment shown in FIG. 4 to FIG. 6, the switchboard management system may predict the lifespan of the device in the switchboard panel 10, based on the environment information obtained via the gateway having the environment sensing unit such as the temperature sensor or the humidity sensor, and the operation information of the device in the switchboard panel 10. Accordingly, the switchboard management system may enable the operator to more effectively manage the device disposed in the switchboard panel 10. Further, the switchboard management system detects impending replacement of the device based on the lifespan prediction of the device and notifies the operator of the impending replacement thereof, so that the operator may prepare for replacement thereof. Accordingly, when the switchboard is inoperable due to failure resulting from exhausted lifespan of the device, the operator may rapidly cope with this situation to effectively reduce a time duration for which the switchboard is operable.

Figure 7:
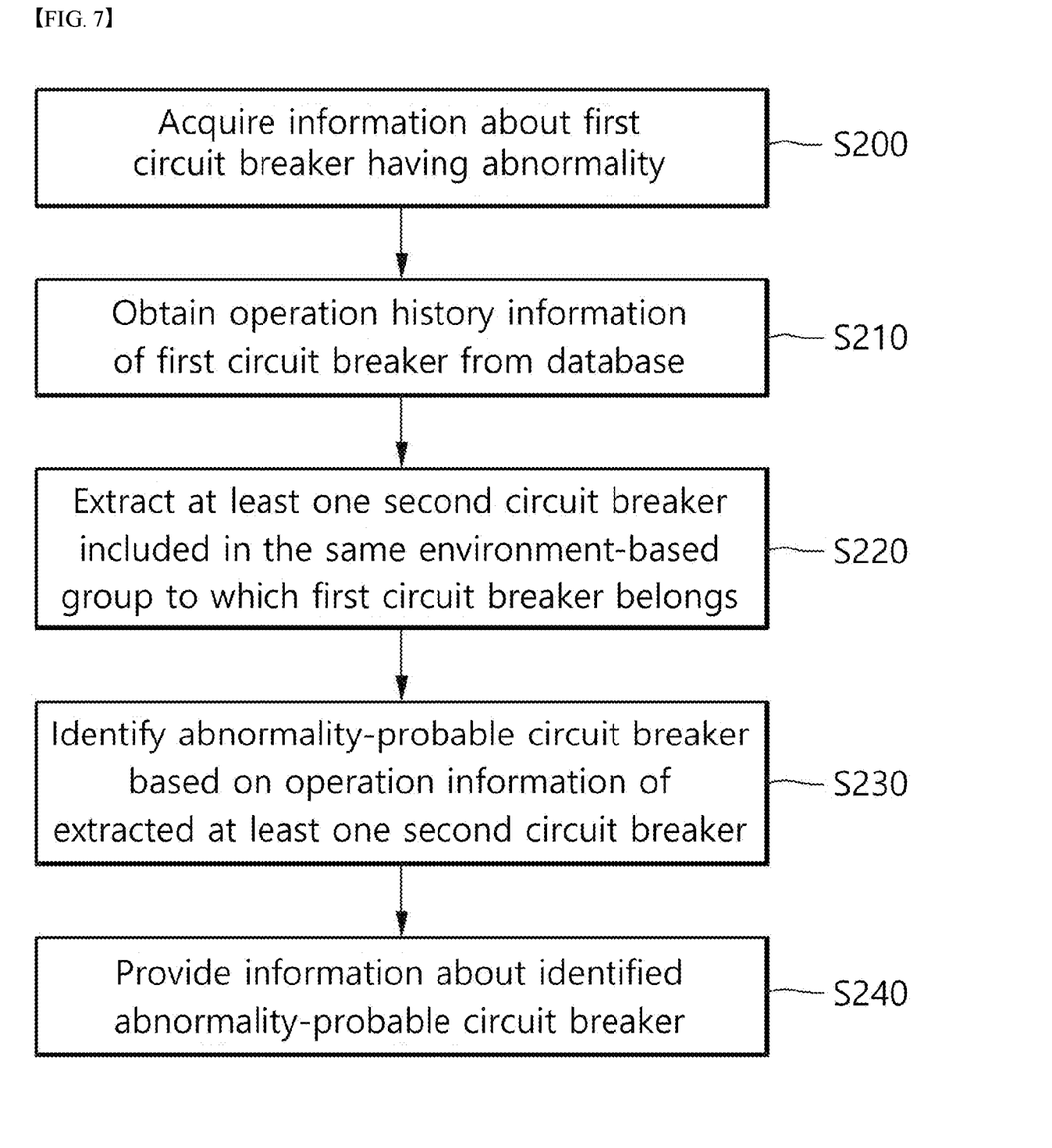
FIG. 7 is a flowchart for describing a method of operating a switchboard management system according to an embodiment of the present disclosure.

FIG. 7 is a flowchart for describing a method of operating a switchboard management system according to an embodiment of the present disclosure.

Referring to FIG. 7, the switchboard management system may acquire information about a first circuit breaker having abnormality among a plurality of the circuit breakers (S200).

As described above, the gateway 14 may be in communication with the circuit breaker, and may obtain information related to the operation of the circuit breaker therefrom. In this connection, in an event of abnormality such as lifespan exhaustion or error in the first circuit breaker, the gateway 14 may obtain information related to the abnormality from the first circuit breaker to detect the abnormality in the first circuit breaker.

Based on the detection result, the gateway 14 may transmit information indicating that the abnormality has occurred in the first circuit breaker to the server 30.

The server 30 may obtain operation information (operation history information) of the first circuit breaker from the database or the memory (not shown) (S210).

The operation information may include the number of on/off times of the first circuit breaker. According to another embodiment, the operation information may further include at least one of an installation date of the first circuit breaker or a load amount (a current amount) of a line on which the first circuit breaker is disposed.

Further, the operation information may further include lifespan (residual lifespan) prediction information according to an increase in the number of on/off times of the first circuit breaker. This will be described in more detail later with reference to FIG. 8.

The server 30 may extract at least one second circuit breaker included in the same environment-based group to which the first circuit breaker belongs, based on the obtained operation information (S220). Based on the operation information of the extracted at least one second circuit breaker, the server 30 may identify an abnormality-probable circuit breaker among the at least one second circuit breakers (S230).

Depending on an embodiment, the step S220 may not be performed. In this case, the server 30 may identify at least one abnormality-probable circuit breaker having the same or similar operation information as the operation information of the first circuit breaker among a plurality of the circuit breakers, regardless of the environment-based group.

The server 30 may provide information on the identified abnormality-probable circuit breaker (S240).

For example, the server 30 may output information about the abnormality-probable circuit breaker on an output device (not shown) or transmit the information to a terminal of the operator or the user. Alternatively, the server 30 may transmit the information to the gateway 14 connected to the abnormality-probable circuit breaker.

Figure 8:
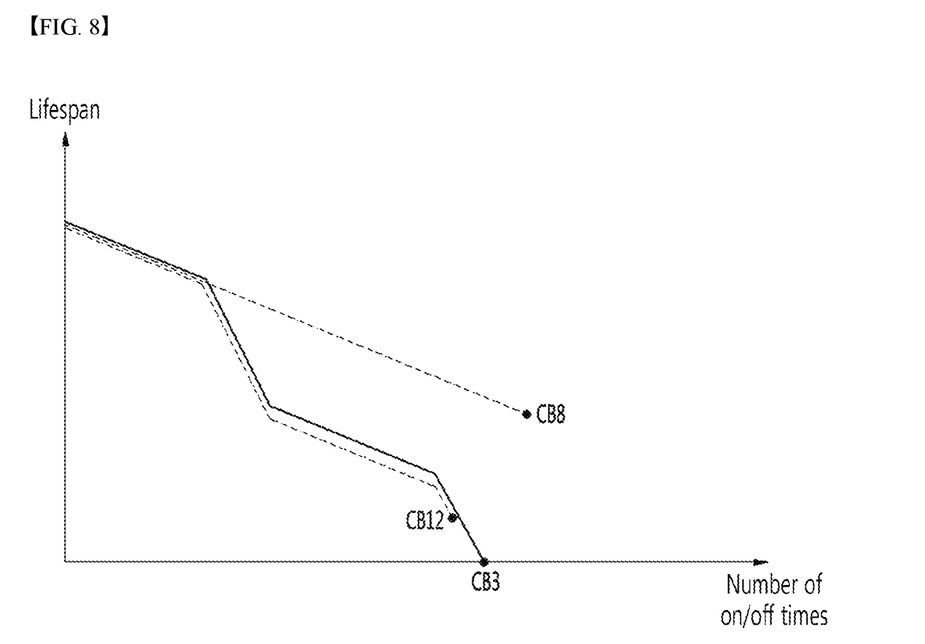
FIG. 8 is a diagram for describing an operation in which the switchboard management system identifies an abnormality-probable circuit breaker based on the embodiment shown in FIG. 7.

FIG. 8 is a diagram for describing an operation in which the switchboard management system identifies an abnormality-probable circuit breaker based on the embodiment shown in FIG. 7.

Referring to FIG. 2 and FIG. 8, a lifespan of the third circuit breaker CB3 among the plurality of the circuit breakers CB1 to CB30 disposed in the plurality of switchboard panels 10a to 10c may be exhausted. Thus, abnormality may occur in the third circuit breaker CB3.

The first gateway GW1 connected to the third circuit breaker CB3 may detect the abnormality of the third circuit breaker CB3, and may transmit the abnormality information of the third circuit breaker CB3 to the server 30.

The server 30 may obtain operation information of the third the circuit breaker CB3 from the database or the memory (not shown).

As shown in a graph form of FIG. 8, the operation information may include lifespan prediction information according to an increase in the number of on/off times of the third circuit breaker CB3. For example, an environment-based group to which the third circuit breaker CB3 belongs may change from the third environment-based group Group3 to the second environment-based group Group2 to the third environment-based group Group3) to the second environment-based group Group2 in this order during the operation of the third circuit breaker CB3. The server 30 may create lifespan prediction information based on the above change in the environment-based group and accumulate and store the created lifespan prediction information.

The server 30 may identify at least one circuit breaker having operation information similar to that of the third circuit breaker CB3, among a plurality of the circuit breakers CB1, CB2, CB4 to CB30 except the third circuit breaker CB3, based on the obtained operation information.

As shown in FIG. 8, the server 30 may identify, as the abnormality-probable circuit breaker, the twelfth circuit breaker CB12 having operation information similar to that of the third circuit breaker CB3, among the eighth circuit breaker CB8 and the twelfth circuit breaker CB12. The similar operation information may have a difference thereof from the operation information of the third circuit breaker CB3 is smaller than a reference value. Alternatively, similarity between the similar operation information and the operation information of the third circuit breaker CB3 may be higher than a reference value.

The server 30 may output a notification or a message indicating that the twelfth circuit breaker CB12 is an abnormality-probable circuit breaker on an output device (not shown), or transmit the notification or the message to a terminal of the operator or the user or may transmit the notification or the message to the third gateway GW3 connected to the twelfth circuit breaker CB12. The operator or the user may check the twelfth circuit breaker CB12 based on the notification or message. When necessary, replacement of the twelfth circuit breaker CB12 may be performed in advance.

That is, according to the embodiment shown in FIG. 7 to FIG. 8, when abnormality occurs in a specific device, the switchboard management system may identify a device having an environment condition or operation information similar to that of the device having the abnormality and may report risk of abnormality of the identified device to the operator. Thus, as the operator or the user may check or examine the identified device in response to the risk of the abnormality, management efficiency of the device may be increased.

The above descriptions are merely illustrative of the technical idea of the present disclosure. Those skilled in the art will be able to make various modifications and variations thereto without departing from the essential characteristics of the present disclosure. Therefore, the embodiments disclosed in the present disclosure are not intended to limit the technical idea of the present disclosure, but to illustrate the technical idea of the present disclosure. The scope of the technical idea of the present disclosure is not limited to these embodiments.

The scope of protection of the present disclosure should be interpreted by the claims below. All technical ideas within the equivalent scope to the claims should be interpreted as being included in the scope of the present disclosure.

What is claimed is:

1. A switchboard management system comprising:
    at least one gateway connected to at least one circuit breaker among a plurality of circuit breakers disposed in a switchboard panel; and
    a server connected to the at least one gateway,
    wherein the at least one gateway includes an environment sensing unit to acquire environment data for an environment around the at least one circuit breaker,
    wherein the server is configured to:
    receive operation information of the plurality of the circuit breakers and the environment data from the at least one gateway; and
    predict a residual lifespan of each circuit breaker of the plurality of the circuit breakers, based on the received operation information and environment data,
    wherein the at least one gateway is configured to detect an abnormality of a first circuit breaker among the plurality of circuit breakers connected to the at least one gateway among the at least one circuit breaker, and transmit information related to the detected first circuit breaker to the server,
    wherein the server is further configured to:
    acquire operation information of the plurality of circuit breakers from a database, including predicted lifespan information; and
    identify a second circuit breaker among the plurality of circuit breakers as an abnormality-probable circuit breaker that is currently free of the abnormality, wherein the second circuit breaker is identified based on the second circuit breaker having associated second operation information having a similarity to associated first operation information of the first circuit breaker that is higher than a reference value.

2. The switchboard management system of claim 1, wherein the environment sensing unit includes:
    a temperature sensor to acquire temperature data among the environment data; and
    a humidity sensor to acquire humidity data among the environment data.

3. The switchboard management system of claim 2, wherein the environment sensing unit further includes at least one of:
    a noise sensor to acquire noise data among the environment data; or
    a vibration sensor to acquire vibration data among the environment data.

4. The switchboard management system of claim 1, wherein the operation information includes information on a number of on/off times of a corresponding circuit breaker.

5. The switchboard management system of claim 4, wherein the server is configured to:
    group the plurality of the circuit breakers into environment-based groups, based on the environment data received from the at least one gateway; and
    predict a residual lifespan of each of the plurality of the circuit breakers, based on an environment-based group including each of the plurality of the circuit breakers, and the operation information of each of the plurality of the circuit breakers.

6. The switchboard management system of claim 5, wherein the server is configured to predict the residual lifespan of each of the plurality of the circuit breakers based on reference data set for the environment-based group including each of the plurality of the circuit breakers,
    wherein the reference data includes data on change in a residual lifespan of each of the plurality of the circuit breakers based on the number of on/off times thereof.

7. The switchboard management system of claim 6, wherein the server is configured to:
    identify at least one circuit breaker as an impending replacement target circuit breaker whose a predicted residual lifespan is lower than a threshold, from the plurality of the circuit breakers; and
    to create a notification or a message indicating that the impending replacement target circuit breaker should be replaced.

8. The switchboard management system of claim 7, wherein the server is configured to output the created notification or message on an output device connected to the server, or to transmit the created notification or message to a terminal connected to the server.

9. The switchboard management system of claim 7, wherein the server is configured to transmit the created notification or message to a gateway connected to the extracted circuit breaker.

10. The switchboard management system of claim 1, wherein each of the at least one gateway is adjacent to the at least one circuit breaker connected thereto.

11. A switchboard management system comprising:
    a gateway connected to a plurality of circuit breakers disposed in a switchboard panel; and
    a server connected to the gateway,
    wherein the gateway includes an environment sensing unit to acquire environment data for an environment around the plurality of circuit breakers,
    wherein the server is configured to:
    receive operation information of the plurality of the circuit breakers and the environment data from the gateway; and
    predict a residual lifespan of each circuit breaker of the plurality of the circuit breakers, based on the received operation information and environment data,
    wherein the gateway is configured to detect an abnormality of a first circuit breaker among the plurality of circuit breakers connected to the gateway, and transmit information related to the detected first circuit breaker to the server,
    wherein the server is further configured to:
    acquire operation information of the plurality of circuit breakers from a database, including predicted lifespan information; and
    identify a second circuit breaker among the plurality of circuit breakers as an abnormality-probable circuit breaker based on the second circuit breaker having associated second operation information having a similarity to associated first operation information of the first circuit breaker that is higher than a reference value, wherein the gateway does not currently detect the abnormality in the second circuit breaker.

* * * * *